Figures 1, 2:
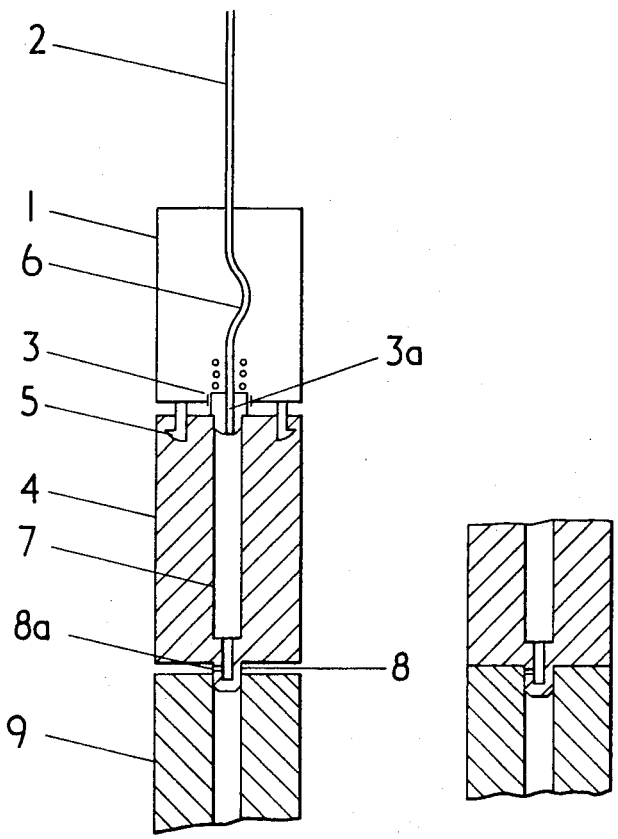

# United States Patent [19]

Cooke

[11] 3,719,072
[45] March 6, 1973

[54] DEVICES FOR SENSING THE RELATIVE LOCATION OF TWO BODIES

[75] Inventor: Brian Frederick Cooke, Knutsford, England

[73] Assignee: The Nuclear Power Group Limited, Knutsford, England

[22] Filed: Oct. 30, 1970

[21] Appl. No.: 85,479

[30] Foreign Application Priority Data

Dec. 9, 1969   Great Britain.....................59,945/69

[52] U.S. Cl................................................73/37.5
[51] Int. Cl..............................................G01b 13/00
[58] Field of Search......73/37.5, 37, 37.6, 37.7, 37.8, 73/37.9; 33/DIG. 2

[56] References Cited

UNITED STATES PATENTS 3,353,402   11/1967   Caligiuri................................73/37.5

Primary Examiner—Louis R. Prince
Assistant Examiner—William A. Henry, II
Attorney—Holman & Stern

[57] ABSTRACT

A device for sensing the relative location of two bodies has means for supplying a flow of fluid to a passage in at least one of the bodies whereby when the two bodies are located correctly with respect to one another, the flow of fluid is interrupted and means are provided for sensing the interruption of fluid flow.

4 Claims, 2 Drawing Figures

PATENTED MAR 6 1973

3,719,072

INVENTOR
BRIAN FREDERICK COOKE
BY Holman & Stern
ATTORNEYS

DEVICES FOR SENSING THE RELATIVE LOCATION OF TWO BODIES

This invention relates to devices for sensing the relative location of two bodies.

It is often necessary to determine whether two bodies are located in a desired manner with respect to one another. Where visual observation is possible, this usually presents no difficulty, but when the bodies are being positioned relative to one another by remote control, difficulties can arise. In nuclear reactors, for example, fuel elements are usually inserted into fuel channels in a reactor core by a charge machine operating outside the pressure vessel housing the core. In a typical arrangement the fuel elements are lowered by means of a grab into the channel and stacked one on top of the other and it is important to ensure that each element seats correctly on the element below.

According to the present invention a device for sensing the relative location of two bodies comprises means for supplying a flow of fluid to a passage in at least one of the bodies whereby when the two bodies are located correctly with respect to one another, the flow of fluid is interrupted and means are provided for sensing the interruption of fluid flow.

In one embodiment of the invention, means are provided to supply a fluid through a grab used to insert nuclear fuel elements in a channel in a reactor core and each fuel element has a passage adapted to receive the said fluid, said passage communicating with a further passage in a projection on the lower face of each element said projection being adapted to enter a recess on the upper face of the fuel element below, the arrangement being that only when the projection is correctly located in its corresponding recess is the flow of fluid through the said passages interrupted.

The recess for receiving the projection of the fuel element above may be formed by the fluid carrying passage in each element.

The invention also consists in a device for sensing the relative location of two bodies substantially as described herein with reference to the accompanying diagrammatic drawings in which:

FIG. 1 shows a grab and a pair of fuel elements incorporating a sensing device in accordance with one embodiment of the invention; and FIG. 2 is a view of the junction between the two elements when correctly located.

In carrying the invention into effect in the form illustrated by way of example a fuel element grab 1 is suspended on a flexible hoisting cable 2, through which cable, gas flows from a fuel charge machine located outside the reactor vessel. For the sake of simplicity the reactor vessel, core and charging machine have been omitted.

The grab includes a spring loaded dowel 3 which contains a gas passage 3a and makes a substantially gas-tight connection with a recess in fuel element 4 when the latter is handled by the grab via its jaws 5. A connection 6 between the cable 2 and the dowel 3 causes the gas to flow through passage 3a in the dowel and to enter passage 7 in fuel element 4. This passage 7 also forms in the embodiment illustrated, the recess for receiving the dowel 3.

At the lower end of the element 4 is a projection or dowel 8 having a passage 8a which communicates with passage 7 and extends transversely to the exterior of the projection. Gas passing through the grab can then flow through the passages 7 and 8a. With the element 4 positioned relative to fuel element 9 below as shown in FIG. 1 a flow of gas will be maintained through these passages.

FIG. 2 shows the elements correctly located relative to one another and it will be seen that the flow of gas is interrupted. The interruption of flow can be detected, for example, by an orifice plate at the supply end of the hoisting cable with a pressure gauge across it. During flow the pressure drops across the plate would be different from that when the flow is obstructed and this gives an indication of when the elements are located correctly relative to one another.

The dowel used to effect a gas connection between grab and element can take several different forms. Use could be made for example of the jaws 5 to connect the gas supply to the element or alternatively it could be in the form of a non-spring-loaded spigot fitting into the recess in the element. The arrangement can also be used with a rigid grab as opposed to one suspended on a flexible cable.

Whilst the invention has been described with particular reference to a fuel element location it can also be used in other applications where it is possible to use a fluid flow as a means of detecting the relative location of two bodies.

Whilst the invention has been described with reference to two fuel elements it could be applied to more than two elements connected to form a string of elements.

I claim:

1. A device for sensing the relative location at least two nuclear fuel elements, comprising means for supplying a flow of fluid through a grab used to insert the nuclear fuel elements in a channel in a reactor core, each fuel element having at least one passage adapted to receive said fluid; said passage having an outlet adjacent the passage in another fuel element and said outlet and said other fuel element being arranged so that when the two fuel elements are located in a desired predetermined relationship with respect to one another, the flow of fluid is interrupted; and means for sensing the interruption of fluid flow.

2. A device as claimed in claim 1, wherein said at least one passage in each fuel element communicates with a further passage in a projection on the lower face of each element to form said outlet, said projection being adapted to enter a recess on the upper face of the fuel element below, the arrangement being that only when the projection of the upper element is correctly located in its corresponding recess is the flow of fluid through the said passages interrupted.

3. A device as claimed in claim 2, wherein the recess for receiving the projection of the fuel element above is formed by the fluid carrying passage in each element.

4. A device as claimed in claim 2, wherein said further passage extends transversely with respect to its associated passage.

* * * * *